(12) United States Patent
Foss

(10) Patent No.: US 6,473,132 B1
(45) Date of Patent: Oct. 29, 2002

(54) METHOD AND APPARATUS FOR EFFECTING VIDEO TRANSITIONS

(75) Inventor: Bruce Allan Foss, Worcester, MA (US)

(73) Assignee: Media 100 Inc., Marlborough, MA (US)

(*) Notice: Subject to any disclaimer, the term of this patent is extended or adjusted under 35 U.S.C. 154(b) by 0 days.

(21) Appl. No.: 09/392,696

(22) Filed: Sep. 9, 1999

(51) Int. Cl.$^7$ .................................................. H04N 9/74
(52) U.S. Cl. ......................... 348/584; 374/590; 374/593
(58) Field of Search ................................ 348/584, 585, 348/590, 591, 593, 594, 595, 597, 598, 599; H04N 9/74

(56) References Cited

U.S. PATENT DOCUMENTS

| | | | |
|---|---|---|---|
| 3,604,849 A | 9/1971 | Shrydstrup | 178/6.8 |
| 3,941,925 A | 3/1976 | Busch et al. | 178/6.8 |
| 4,205,346 A | 5/1980 | Ross | 358/181 |
| 4,698,666 A | 10/1987 | Lake, Jr. et al. | 358/22 |
| 4,751,579 A | 6/1988 | Okunishi et al. | 358/183 |
| 4,758,892 A | 7/1988 | Bloomfield | 358/183 |
| 4,764,809 A | 8/1988 | Haycock et al. | 358/183 |
| 4,782,392 A | 11/1988 | Haycock et al. | 358/183 |
| 4,805,022 A | 2/1989 | Abt | 358/183 |
| 4,809,072 A | 2/1989 | Pohl | 358/183 |
| 4,811,102 A | 3/1989 | Chaplin | 358/183 |
| 4,823,183 A | 4/1989 | Jackson et al. | 358/22 |
| 4,853,784 A | 8/1989 | Abt et al. | 358/181 |
| 4,855,834 A | 8/1989 | Cawley et al. | 358/183 |
| 4,862,272 A | 8/1989 | Karlock | 358/181 |
| 4,954,898 A | 9/1990 | Nakata | 358/183 |
| 4,991,014 A | 2/1991 | Takahashi et al. | 358/183 |
| 5,008,755 A | 4/1991 | Brain | 358/183 |
| 5,027,213 A | 6/1991 | Kamin | 358/183 |
| 5,109,280 A | 4/1992 | Karlock | 358/181 |
| 5,181,100 A | 1/1993 | Hodgson | 358/37 |
| 5,184,222 A | 2/1993 | Yanagisawa | 358/183 |
| 5,185,666 A | 2/1993 | Capitant et al. | 358/183 |
| 5,241,390 A | 8/1993 | Kawamoto | 358/183 |
| 5,305,108 A | 4/1994 | Trytko | 348/594 |
| 5,353,068 A | 10/1994 | Moriwake | 348/585 |
| 5,412,479 A | 5/1995 | Alig et al. | 348/594 |
| 5,416,526 A * | 5/1995 | Lake | 348/590 |
| 5,416,529 A | 5/1995 | Lake | 348/590 |
| 5,426,467 A | 6/1995 | Moriwake et al. | 348/584 |
| 5,432,528 A | 7/1995 | Ritter | 345/115 |
| 5,515,110 A | 5/1996 | Alig et al. | 348/594 |
| 5,528,310 A | 6/1996 | Peters et al. | 348/593 |
| 5,675,392 A | 10/1997 | Nayebi et al. | 348/584 |
| 5,812,216 A | 9/1998 | Peters et al. | 348/593 |
| 5,825,433 A | 10/1998 | Yamada et al. | 348/584 |
| 5,905,539 A | 5/1999 | Angell | 348/594 |
| 6,141,063 A * | 10/2000 | Gehrmann | 348/592 |
| 6,243,143 B1 * | 6/2001 | Hatalsky et al. | 348/584 |
| 6,362,854 B1 * | 3/2002 | Fierke et al. | 348/584 |

FOREIGN PATENT DOCUMENTS

| | | |
|---|---|---|
| GB | 2 323 735 A | 9/1998 |
| WO | WO 98/46013 | 10/1998 |

* cited by examiner

*Primary Examiner*—John Miller
*Assistant Examiner*—Trang U. Tran
(74) *Attorney, Agent, or Firm*—Fish & Richardson P.C.

(57) ABSTRACT

Combining first and second video streams into a combined output video stream by inputting a first transition proximity map listing proximity values for pixels in a video frame made up of lines of pixels, each proximity value indicating a distance from a pixel to a video transition, applying a mapping function to convert each proximity value to a key value indicating the relative amount of the first and second video stream to be included in a combined output video stream, and combining pixel values of the first and second video streams based upon respective key values.

9 Claims, 5 Drawing Sheets

```
          5  4  4  5
       5  4  3  3  3  4  5
    5  4  3  2  2  2  3  4  5
    4  3  2  1  1  1  2  3  4
    4  3  2  1  0  1  2  3  4
    4  3  2  1  1  1  2  3  4
       4  3  2  2  2  3  4
          4  3  3  3  4
             4  4  4
```

Gamma Values

```
  2  1  1  1  2
2 1  1  0  0  1  1 2
2 1  0 -1 -1  0  1 2
  1  0 -1 -1  0  1 2
  1  1  0  0  1  1 2
     1  1  1  1  2
```

Transition Proximity
P-Values

Transition Proximity Map
P-Values

FIG. 3B

METHOD AND APPARATUS FOR EFFECTING VIDEO TRANSITIONS

BACKGROUND OF THE INVENTION

The invention relates to effecting video transitions between video streams.

In editing of video in the creation of a video program, it is often desirable to provide a gradual transition from one video stream to another video stream. For example, in a wipe transition, a line may move across the screen from left to right, with the old scene gradually disappearing at the right while more and more of the new scene appears at the left. In a so-called "iris wipe," the boundary is an expanding circle, and one video stream appears in an expanding circle, and the other is outside of the circle.

Referring to FIG. 1, transitions can be created at a video combiner 10 having a first video input 12 for a first video stream, a second video input 14 for a second video stream, a key input 16 to receive key values indicating how the two inputs are to be combined, and a video output 18 for the output video that is some combination of the two inputs. The video streams include frames (each frame providing an image for a screen) made up of horizontal lines, each of which includes individual "pixels" (picture elements) across the line. Each pixel value includes a number of bits that describe the color and intensity at that particular pixel at a particular time. New frames are provided at the video rate, e.g., 30 frames per second, and the first, second and output video streams include sequential digital data describing sequential pixel values for lines of video data in a frame. The pixels for the first and second video streams that are input to combiner 10 are synchronized, as are the associated key values. The key value for a given pixel indicates whether the output for that pixel is the input from one stream or the other stream or a combination of the two.

Typically, the keys are generated based on an x,y table of gamma values, one gamma value corresponding to each of x pixels in y lines of the frame, with the value indicating the time at which the transition appears at that pixel. FIG. 2 is a simplified diagram (a frame has hundreds of lines and hundreds of pixels in each line) of table 20 of gamma values for an iris wipe. As the time goes from frames 1 to 2 to 3 to 4 to 5 etc, the diameter of the iris transition expands. The key values that are generated from the table cause a switchover at the transition from one video input to the other. "Softness" is added to the key values generated so that the switchover is not abrupt but instead is gradual as the transition passes a pixel location. The extent of softness is typically fixed by the hardware, and not subject to change.

SUMMARY OF THE INVENTION

The invention features, in general, combining first and second video streams into a combined output video stream. A first transition proximity map listing proximity values for pixels in a video frame made up of lines of pixels is input to a processor; each proximity value indicates a distance from a pixel to a video transition. A mapping function is then applied to convert each proximity value to a key value indicating the relative amount of the first and second video stream to be included in a combined output video stream. The pixel values of the first and second video streams are then combined based upon respective key values.

Particular embodiments of the invention may include one or more of the following features. One or more additional proximity maps are used to generate key values at different times. Additional transition proximity maps are interpolated (e.g., by linear interpolation) from the first and second transition proximity maps. The combining is carried out at a video combiner having an input for the first video stream, an input for the second video stream, an input for the key values, and a video output.

Embodiments of the invention may include one or more of the following advantages. Transition proximity maps can be easily created and modified, permitting flexibility it creating transitions. The proximity values can have sufficient bits (e.g., 2 to 8 bits) to define fractions of pixels, permitting a higher resolution and smoother, more gradual transitions than with gamma values. A relatively small number of transition proximity maps can be generated ahead of time, and the interpolated tables can be generated on the fly during editing. The softness can also easily be varied to have gradual softness or an abrupt change at the transition by using a different look-up table at a processor that performs the mapping function.

Other advantages and features of the invention will be apparent from the following description of the preferred embodiment and the claims.

BRIEF DESCRIPTION OF THE DRAWING

FIGS. 3A and 3B are diagrams of transition proximity maps indicating distance of a pixel from a transition.

DESCRIPTION OF THE PREFERRED EMBODIMENT

Referring to FIGS. 3A and 3B, transition proximity maps 30, 32 are tables that define the state of a video transition from one video stream to another video stream at two particular times. Zero values indicate exactly where the transition is located; negative values indicate the distance of a pixel from a transition on one side of the transition, and positive values indicate the distance of a pixel from a transition on the other side of the transition. FIG. 3A corresponds to one time (e.g., frame 1), and FIG. 3B corresponds to another time (e.g., frame 300 part way through a transition). Additional proximity maps are generated for each frame between the frames for FIGS. 3A and 3B by linear interpolation.

Figures 1, 2:
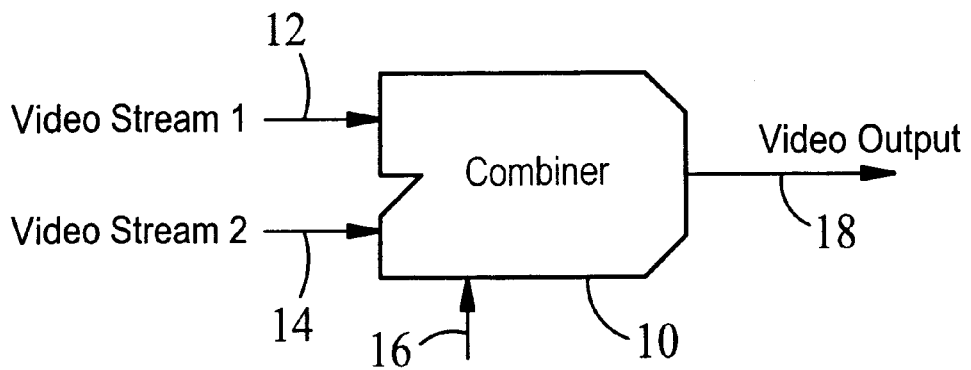
FIG. 1 is a block diagram showing a prior art video combiner for combining first and second video streams.
FIG. 2 is a diagram of a prior art table of gamma values used to generate key values for the FIG. 1 video combiner.
Figure 4:
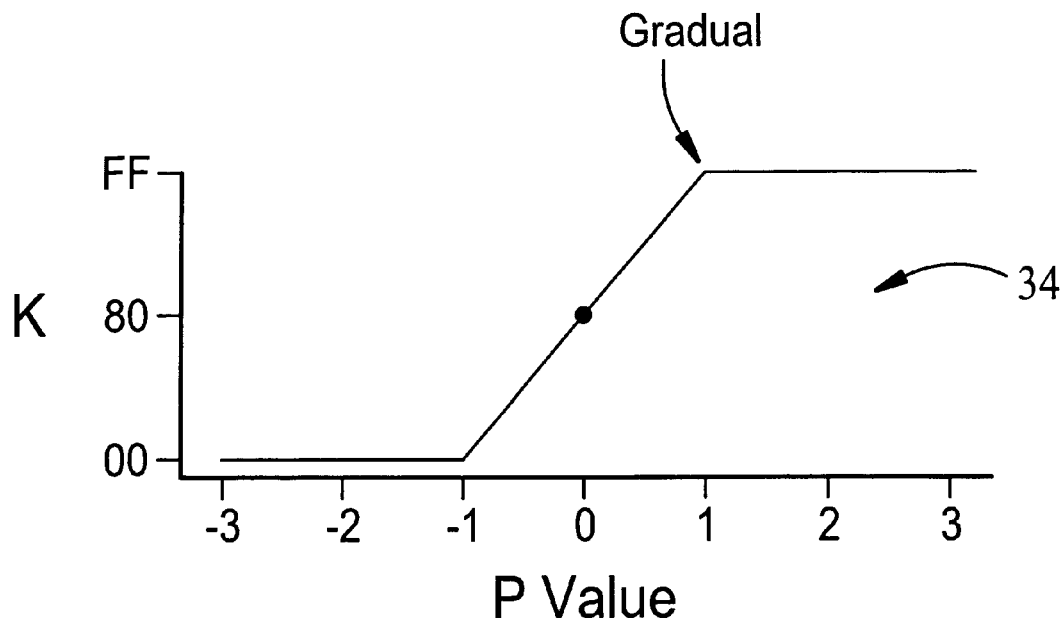
FIGS. 4 and 5 are graphs showing proximity value (X) versus key value (Y) for different amounts of transition softness.
Figure 5:
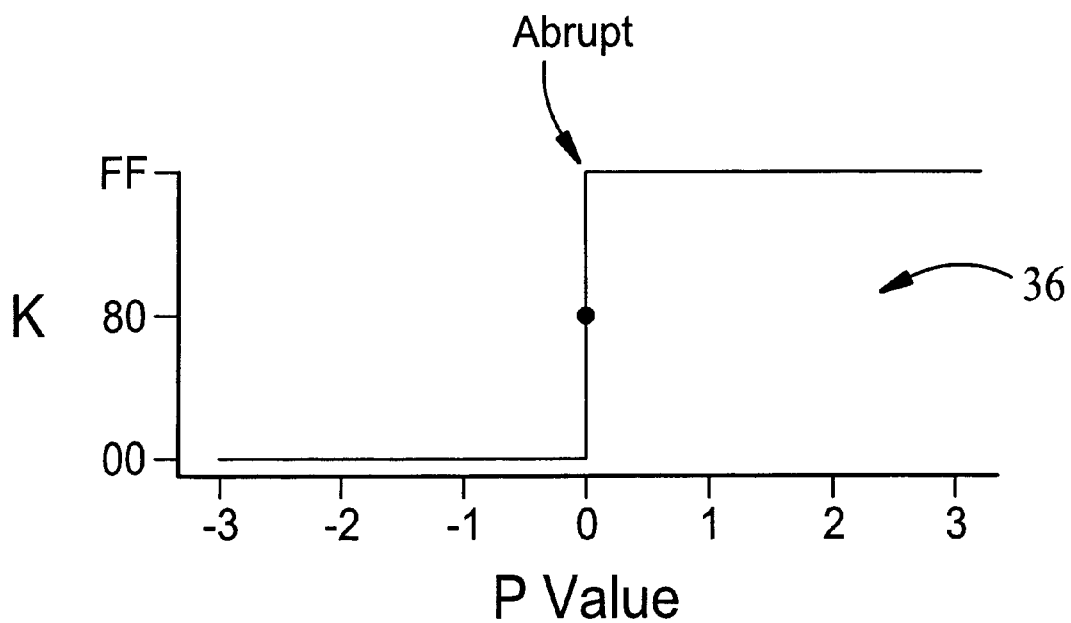

The values P of the table are mapped, through an appropriate look up table 34 or 36 (see FIGS. 4 and 5) to generate key values (K) that indicate the mixing of the pixel values. A K of 00 indicates all of video stream 1; FF indicates all of video stream 2, and 80 indicates an equal mix of each.

The proximity values preferably include sufficient bits (e.g., 2 to 8 bits) to define fractions of pixels, permitting a higher resolution and smoother, more gradual transitions than with gamma values. The softness can also easily be varied to have gradual softness (as in FIG. 4) or an abrupt change at the transition (FIG. 5) by using a different look-up table. A relatively small number of transition proximity maps can be generated ahead of time, and the interpolated tables can be generated on the fly at an onboard circuit or processor or a host CPU.

Figure 6:
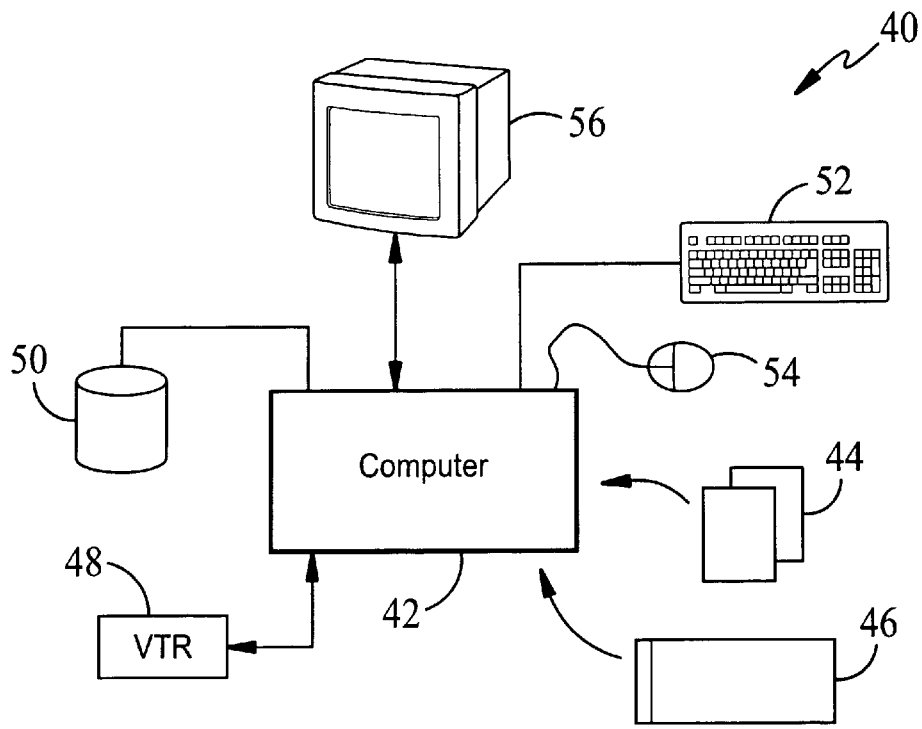
FIG. 6 shows a video editing system.
Figure 7:
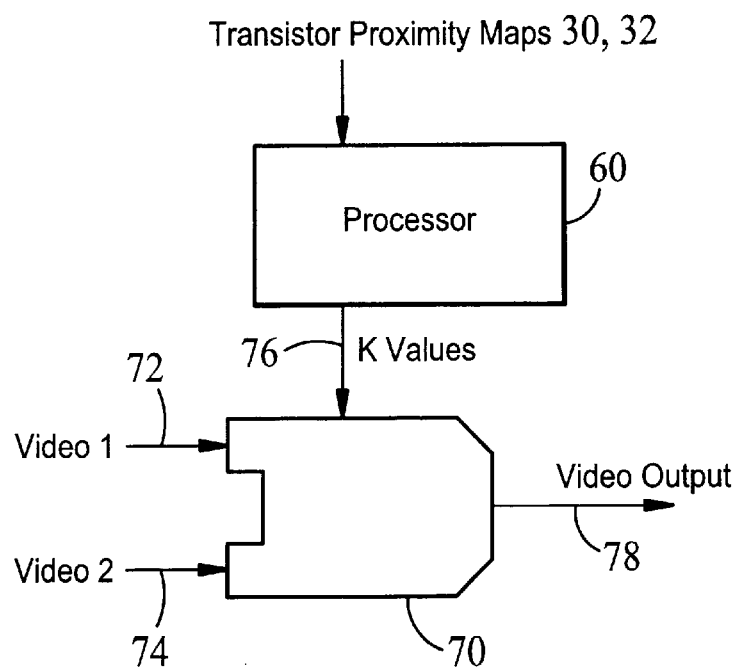
FIG. 7 shows some of the components of a video editing card used in the FIG. 6 system.
Figure 8:
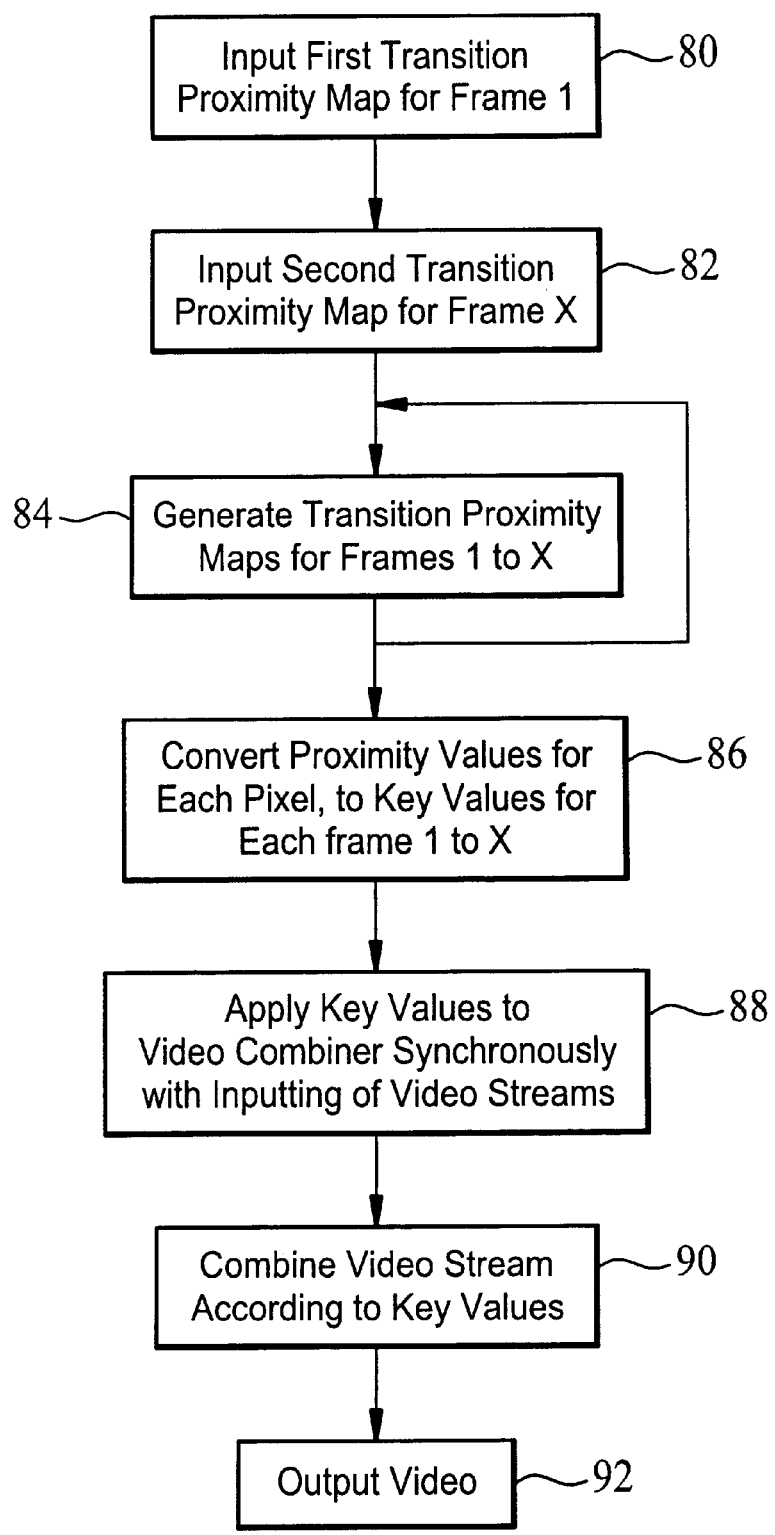
FIG. 8 is a flow chart of the steps employed by the FIGS. 6 and 7 apparatus in combining video streams.

FIGS. 6 and 7 show hardware components that can be used in carrying out the invention. FIG. 8 is a flow chart of the steps employed by the FIGS. 6 and 7 apparatus for an example in which two transition proximity maps 30, 32 (for frames 1 and x respectively) are used to generate key values for frames 1 to X.

Referring to FIG. 6, video editing system 40 is implemented by computer 42, video editing software 44 running on computer 42, and video editing expansion card 46 plugged into computer 42. Video editing card 46 includes a digitizer to convert an analog video signal to a digital video stream, compressors/decompressors, buffering, special effects hardware and other components. VTR 48 is a source of video that can be digitized and stored on storage 50 and randomly accessed by computer 42. Keyboard 52 and mouse 54 are user input devices, and monitor 56 is used to provide a video editing interface including display of a program being created. An additional monitor (not shown) can also be used to play the video program. U.S. Pat. Nos. 5,506,932; 5,488,695; and 5,471,577 and U.S. Ser. No. 09/044,461, filed Mar. 19, 1998, which are hereby incorporated by reference, describe video editing systems implemented a computer.

Referring to FIG. 7, video editing card 46 includes on-board processor 60 and video combiner 70, having first and second video inputs 72, 74, key input 76, and video output 78. As noted above, card 46 can have many other components (not shown).

Referring to FIGS. 7 and 8, transition proximity maps 30, 32 (which are generated ahead of time) are input to processor 60 in steps 80, 82. Interpolated transition proximity maps for frames between frames 1 and X are generated at processor 60 by linear interpolation (step 84). Proximity values are converted to key values at processor 60 using a selected look-up table 34 or 36 (step 86). The key values are inputted at input 76 to video combiner 70 synchronously with inputting of video streams 1 and 2 to inputs 72, 74 (step 88). Video combiner 70 combines video streams 1 and 2 according to the key values (step 90), and outputs combined video (step 92).

Other embodiments of the invention are within the scope of the appended claims.

What is claimed is:

1. A method of combining first and second video streams into a combined output video stream comprising inputting a first transition proximity map listing proximity values for pixels in a video frame made up of lines of pixels, each said proximity value indicating a distance from a pixel to a video transition, said transition being from said first video stream to said second video stream, applying a mapping function to convert each said proximity value to a key value indicating the relative amount of said first and second video stream to be included in a combined output video stream, and combining pixel values of said first and second video streams based upon respective said key values.

2. The method of claim 1 wherein said first transition proximity map is related to particular synchronized frames of said video streams at a first time and further comprising inputting a second transition proximity map that is related to particular synchronized frames of said first and second video streams at a second time, and wherein said applying is carried out for proximity values in said first and second transition proximity maps.

3. The method of claim 2 further comprising interpolating additional transition proximity maps for additional times from said first and second transition proximity maps.

4. The method of claim 3 wherein said interpolating is a linear interpolation.

5. The method of claim 2 wherein said combining is carried out at a video combiner having an input for said first video stream, an input for said second video stream, an input for said key values, and a video output.

6. Apparatus for combining first and second video streams into a combined output video stream comprising a processor for receiving a first transition proximity map listing proximity values for pixels in a video frame made up of lines of pixels, each said proximity value indicating a distance from a pixel to a video transition, said transition being from said first video stream to said second video stream, said processor including a mapping function to convert each said proximity value to a key value indicating the relative amount of said first and second video streams to be included in a combined output video stream, said processor outputting key values, and a video combiner connected to receive said key values from said processor and having inputs for first and second video streams, said combiner combining pixel values of said first and second video streams based upon respective said key values.

7. The apparatus of claim 6 wherein said first transition proximity map is related to particular synchronized frames of said video streams at a first time and wherein said processor is adapted to receive a second transition proximity map that is related to particular synchronized frames of said first and second video streams at a second time, and wherein said wherein said processor is adapted to employ said mapping function for proximity values in said first and second transition proximity maps.

8. The apparatus of claim 7 wherein said processor is adapted to interpolate additional transition proximity maps for additional times from said first and second transition proximity maps.

9. The apparatus of claim 8 wherein said interpolating is a linear interpolation.

* * * * *